UNITED STATES PATENT OFFICE.

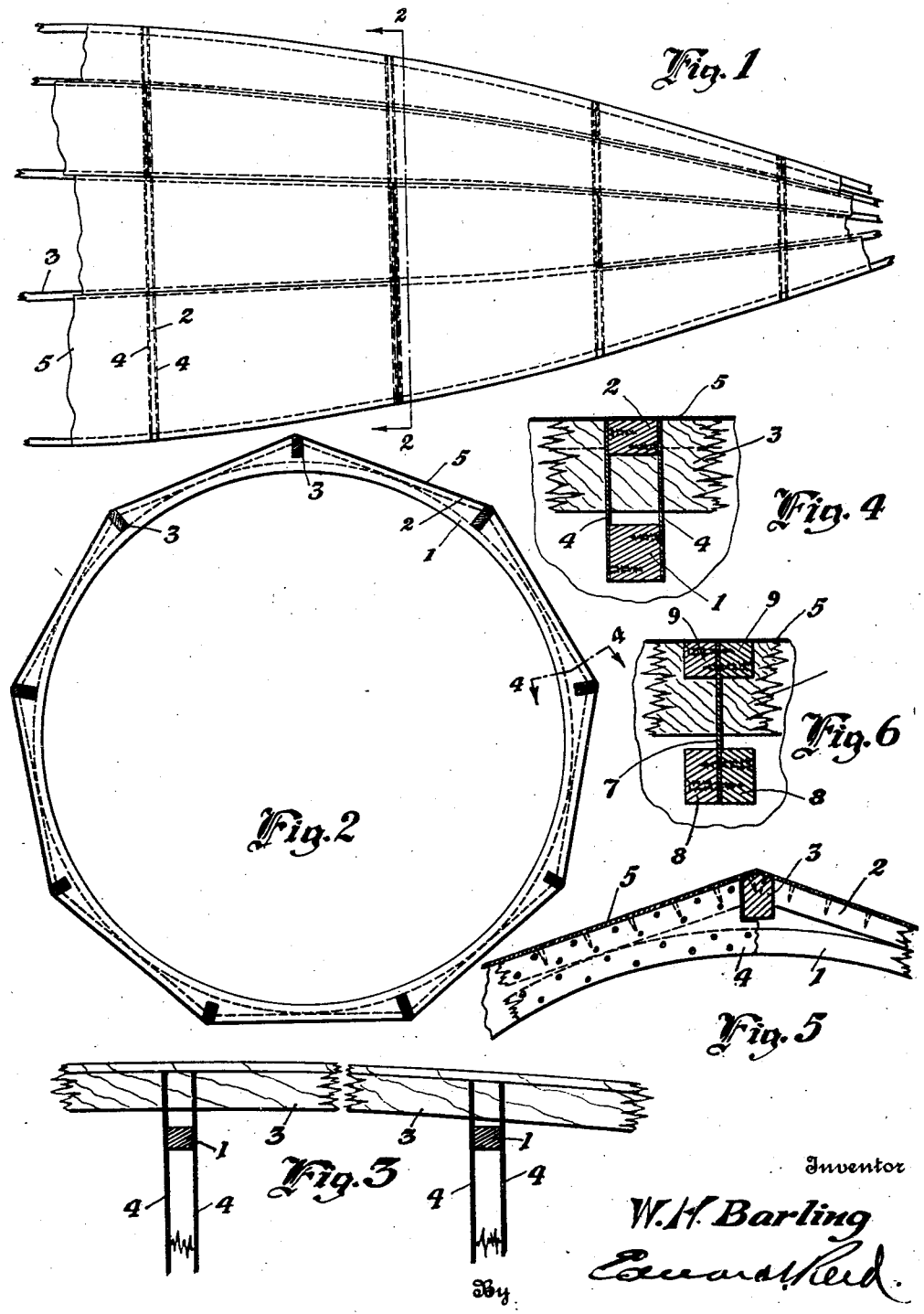

WALTER H. BARLING, OF LONDON, ENGLAND.

FUSELAGE.

1,347,670. Specification of Letters Patent. Patented July 27, 1920.

Application filed November 24, 1919. Serial No. 340,188.

*To all whom it may concern:*

Be it known that WALTER H. BARLING, a subject of the King of Great Britain, residing at London, in the county of London, England, have invented certain new and useful Improvements in Fuselages, of which the following is a specification, reference being had therein to the accompanying drawing.

This invention relates to fuselages, and while it is designed more particularly for the construction of semi-monocoque fuselages for aircraft, its use is not limited to such structures but it may be utilized for the construction of various structures requiring lightness and strength, such, for example, as submarine shells and automobile stream line bodies.

The semi-monocoque fuselage construction consists essentially of a plurality of longitudinal frame members, or longerons, which are supported by a series of transverse frame members, or rings. A covering, or skin, of thin material is supported by and secured to the longerons and rings, and in order that the skin may rest upon and be secured to both the longerons and the rings it is necessary that the outer surfaces of these parts should be substantially flush at their points of intersection. To accomplish this it has been customary to adapt either one of two methods of construction. One method consists in slotting the rings transversely to form recesses to receive the longerons. This construction is unsatisfactory because it tends to weaken the ring structure, and even if the ring be made of sufficient size to compensate for the portions cut away, there is a tendency on the part of the rings to split circumferentially from the recesses. The second method consists in securing the longerons to either the inner or outer circumferences of the rings and then packing the inner member between its points of intersection with the outer member to provide a supporting surface for the skin. If the longerons are secured to the outer surfaces of the rings it is necessary to provide the circumference of each ring, between the longerons, with filler strips, or packing, which will bring this surface flush with the outer surface of the longerons. If the longerons are secured to the inner surfaces of the rings then the longerons must be packed to bring their outer surfaces flush with the outer surfaces of the rings. This construction is costly and expensive to build.

The object of the present invention is to provide a transverse frame member, or ring, for a structure of this kind which will provide supporting surfaces upon which the skin may rest and to which it may be secured without resorting to either of the expedients to which I have referred and which will be of a light strong construction and of low cost.

It is also an object of the invention to provide a frame member, or ring, to which the skin may be applied in flat sections, thus doing away with the slow and expensive method of shaping the skin sections to conform to the contour of the rings and longerons.

Other objects of the invention will appear as the construction is described in detail.

In the accompanying drawings, Figure 1 is a side elevation of a portion of a fuselage embodying my invention; Fig. 2 is a transverse sectional view taken on the line 2—2 of Fig. 1; Fig. 3 is a longitudinal sectional view of a portion of the fuselage of Fig. 1; Fig. 4 is a transverse sectional view taken on the line 4—4 of Fig. 2; Fig. 5 is a side elevation of a portion of one of the rings, partly broken away; Fig. 6 is a sectional view of a modified form of the ring.

In these drawings I have illustrated one embodiment of my invention and have shown the same as applied to a semi-monocoque fuselage for an airplane. In this construction I have utilized a base ring, which will hereinafter be called the hoop to distinguish from the ring as a whole, and have mounted about the periphery of this hoop a series of supporting members or bars which are arranged in the plane of the hoop and which have their ends spaced apart to receive the longerons. The supporting members or bars may be rigidly secured to the hoop in any suitable manner which will not close the spaces between the ends of the bars. It will be understood that the construction here shown has been chosen for the purpose of illustration only and that the shape and arrangement of the several parts may be varied to accommodate them to structures of different shapes.

In the particular construction here shown

I have utilized a base hoop 1 which is circular in shape and which may be of a laminated wood construction, or may be of any suitable material and construction. Mounted upon this base hoop are a series of supporting members or bars 2 which are here shown as flat straight bars arranged in the plane of the base hoop and extending tangentially thereof. The several bars have their adjacent ends spaced apart to receive the longerons 3 between them. The bars may be all of one length and may be all arranged in similar positions, as shown in Fig. 2, but obviously by making the bars of different lengths the exterior contour of the ring as a whole may be changed and it will be understood not only that the shape of the structure as a whole may be varied by varying the relative lengths of, and arrangement of, the supporting bars but also that the base hoop itself need not necessarily be circular in form but may take any desired shape so long as it is not angular. The several supporting bars are rigidly secured to the base hoop and this may be accomplished in any suitable manner, preferably however, I utilize side members for the ring which overlap and are rigidly secured to both the base hoop and the supporting bars. I prefer that there should be one of these side members on each side of the ring structure, as shown at 4, and that they should be continuous. As here shown I have employed two continuous side members, or plates, which are of an internal diameter substantially equal to the internal diameter of the base hoop and are of an external diameter substantially equal to the external diameter of the completed ring, so that their outer edges are approximately flush with the outer edges of the bars 2. The outer edges of the side members, or plates, are preferably shaped to conform to the contour given to the ring by the supporting bars and in the preferred construction these side plates will have their outer edges polygonal. The side members are rigidly secured to both the base hoop and the several supporting bars by means of screws, rivets, or other suitable fastening devices, and when they have been so attached to the hoop and the supporting bars a light weight unitary structure of great strength has been provided. The side members are provided in their outer edges with recesses or notches which register with the spaces between the ends of the bars and form seats for the longerons. These recesses may be of sufficient depth to permit the longerons to rest upon the base hoop if desired, but this is not necessary as the longerons may rest upon the bottoms of the recesses. In the present drawings I have shown the recesses of both depths, the longerons being of different widths, but in the commercial construction recesses of a single depth would probably be used. A covering, or skin, 5 is supported on and rigidly secured to the outer surfaces of the supporting bars and of the longerons, and because of the straight flat outer surfaces of the bars it is possible to apply the skin in flat sections, as distinguished from the molded sections commonly employed thus not only effecting a material saving in the cost of the construction but also making a very material saving in time. The outer edges of the longerons are shown as beveled in opposite directions to provide surfaces flush with the surfaces of the adjacent supporting bars and the skin may be applied by laying the flat sections upon the bars and longerons, with their edges abutting, and attaching the sections to the bars and the longerons by suitable fastening devices, such as screws.

In the preferred construction of the device I have employed two side members, or plates, 4, but it will be obvious that a single member could be used either in the construction shown in Figs. 1 to 5 or in a modified form of construction. In Fig. 6 I have shown a slight modification of the ring structure in which I employ one side member 7 only. In this construction the base hoop 8 is divided circumferentially into two parts and the skin supporting bars 9 are also divided longitudinally into two parts. The side member 7 which connects the bars to the hoop is arranged between the two parts of the hoop and the two parts of the bar and these parts are rigidly secured thereto by suitable fastening devices, such as screws, thus providing a structure which is I-shaped in cross section instead of the box shaped structure Fig. 4. In this form of the device, as well as in the form above described, the side ring may if desired comprise a single continuous plate but this is not essential as in either instance it may be preferable under certain circumstances, particularly in large structures, to form the connecting, or side, members in sections.

From the foregoing description it will be apparent that I have provided a very simple and easily built ring structure in which the base hoop is of a smooth continuous construction so that it is very easy to make, and being without notches or angles is mechanically strong, particularly when it is of a laminated construction, and in which the outer circumference of the ring comprises a series of flat surfaces to which the flat sections of the skin may be applied. The whole construction is very light in weight and of a very strong, durable character which can be manufactured at a relatively low cost.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In a structure of the character described, a frame member comprising a base hoop, a series of bars arranged about the periphery of said hoop and having their intermediate portions in contact with said hoop and their end portions spaced from said hoop, the adjacent bars having their ends spaced apart to form a recess between them, and means for rigidly securing said bars to said hoop.

2. In a structure of the character described, a frame member comprising a base hoop and a series of bars arranged about the periphery of said hoop, extending tangentially thereto and rigidly secured thereto, the adjacent ends of said bars being spaced apart to form recesses.

3. In a structure of the character described, a frame member comprising a base hoop and a series of bars arranged in the plane of said hoop and spaced about the periphery thereof, said bars being supported between their ends on said hoop and having their end portions out of engagement therewith and spaced longitudinally one from the other, and a side member overlapping said hoop and said bars and rigidly secured thereto.

4. In a structure of the character described, a frame member comprising a base hoop, a series of bars arranged about the periphery of said hoop and extending tangentially thereto, said bars having their adjacent ends spaced apart to form recesses, and side members rigidly secured to said hoop and said bars on both sides thereof.

5. In a structure of the character described, a frame member comprising a base hoop, a series of bars arranged about the periphery of said hoop and extending tangentially thereto, said bars having their adjacent ends spaced apart to form recesses, and continuous side members arranged on both sides of said hoop and said bars and rigidly secured thereto, said side members having their outer edges notched adjacent to the spaces between the ends of said bars.

6. In a structure of the character described, a frame member comprising a base hoop, a series of bars having flat outer surfaces arranged about the periphery of said hoop in the plane thereof, said bars having their adjacent ends spaced apart to form recesses, and side members arranged on both sides of said hoop and said bars and rigidly secured thereto, said side members having their outer edges polygonal in shape and provided with notches adjacent to the spaces between the ends of said bars.

7. In a structure of the character described, the combination with a series of transverse frame members each comprising a base hoop, a series of tangential bars arranged about the periphery of said hoop and having their adjacent ends spaced apart to form recesses, and side members rigidly secured to both said hoop and said bars on both sides thereof, of longitudinal frame members mounted in the recesses between the ends of the tangential bars of the respective transverse frame members, and covering material resting upon and secured to the outer surfaces of said tangential bars and said longitudinal frame members.

8. In a structure of the character described, the combination with a series of transverse frame members each comprising a base hoop, a series of tangential bars arranged about the periphery of said hoop, having flat outer surfaces and having their adjacent ends spaced apart to form recesses, and side members arranged on the opposite sides of and rigidly secured to said hoop and said bars, of longitudinal frame members mounted in the recesses between the ends of the tangential bars of the respective transverse frame members, and flat sections of covering material resting upon and secured to the flat surfaces of said tangential bars and said longitudinal frame members.

9. In a structure of the character described, an endless base member having a smooth continuous periphery, and a series of supporting members arranged about the exterior surface of said base member substantially in the plane thereof, said supporting members being rigidly secured to said base member and having flat skin supporting surfaces.

10. In a structure of the character described, an endless base member having a smooth continuous periphery, and a series of supporting members arranged about and rigidly secured to said base member and having flat supporting surfaces, longitudinal frame members extending transversely to said base member between the ends of the respective supporting members, and flat sections of covering material resting upon and secured to said longitudinal frame members and said supporting members.

11. In a structure of the character described, an endless base member having a smooth continuous periphery, and a series of supporting members arranged about the periphery of said base member and having flat supporting surfaces, and a connecting member overlapping the base member and the supporting members and rigidly secured thereto.

12. In a structure of the character described, a frame member comprising a base hoop, a series of bars arranged about the periphery of said hoop and extending tangentially thereto, said bars having their adjacent ends spaced apart, and a connecting member rigidly secured to said hoop and said bars to connect the same one to the other.

13. In a structure of the character described, a curved base member, a supporting member mounted between its ends on the outer periphery of said curved base member and having a flat supporting surface, and a connecting member overlapping said base member and said supporting member and rigidly secured thereto.

14. In a structure of the character described, an endless base member, and a series of supporting members arranged about the outer periphery of said base member, supported between their ends thereon and having flat supporting surfaces, and a single connecting member arranged on each side of and overlapping said base member and said supporting members and rigidly secured thereto.

15. In a structure of the character described, a base hoop, a series of skin-supporting members arranged about the exterior surface of said hoop and extending tangentially thereto, and means for rigidly securing said skin-supporting members to said hoop.

In testimony whereof I affix my signature hereto.

WALTER H. BARLING.